(12) United States Patent
Bussit et al.

(10) Patent No.: US 9,194,423 B2
(45) Date of Patent: Nov. 24, 2015

(54) ROLLING BEARING DEVICE, IN PARTICULAR FOR A STEERING COLUMN

(71) Applicant: Aktiebolaget SKF, Göteborg (SE)

(72) Inventors: Sylvain Bussit, Monnaie (FR); Daniel Jansen, Tours (FR); Tommy Jullien, Tours (FR); Thomas Lepine, Villandry (FR); Bruno Montboeuf, Cerelles (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/324,845

(22) Filed: Jul. 7, 2014

(65) Prior Publication Data

US 2015/0010259 A1 Jan. 8, 2015

(30) Foreign Application Priority Data

Jul. 5, 2013 (FR) .................................... 13 56660

(51) Int. Cl.
| | | |
|---|---|---|
| *F16C 27/06* | (2006.01) | |
| *F16C 19/06* | (2006.01) | |
| *B62D 1/16* | (2006.01) | |
| *B62D 65/00* | (2006.01) | |
| *F16C 35/073* | (2006.01) | |
| *F16C 25/08* | (2006.01) | |
| *F16C 19/16* | (2006.01) | |

(52) U.S. Cl.
CPC .............. *F16C 27/066* (2013.01); *B62D 1/16* (2013.01); *B62D 65/00* (2013.01); *F16C 19/06* (2013.01); *F16C 25/083* (2013.01); *F16C 35/073* (2013.01); *F16C 19/163* (2013.01); *F16C 2326/24* (2013.01); *Y10T 29/49696* (2015.01)

(58) Field of Classification Search
CPC ...... F16C 27/066; F16C 19/06; F16C 35/073; F16C 25/083; F16C 19/163; F16C 2326/24; B62D 1/16; Y10T 29/49696
See application file for complete search history.

(56) References Cited

U.S. PATENT DOCUMENTS

| | | | |
|---|---|---|---|
| 918,600 A | | 4/1909 | Schacht |
| 2,232,473 A | * | 2/1941 | Pulleyblank .................. 384/518 |
| 5,826,987 A | | 10/1998 | Beaman |
| 6,227,715 B1 | * | 5/2001 | Erhardt et al. ................ 384/518 |

FOREIGN PATENT DOCUMENTS

| | | |
|---|---|---|
| DE | 102009038222 A1 | 2/2011 |
| EP | 1184583 A1 | 3/2002 |
| FR | 2756885 A1 | 6/1998 |
| FR | 2806135 A1 | 9/2001 |
| WO | 0169098 A1 | 9/2001 |
| WO | WO 2013017158 A1 * | 2/2013 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A rolling bearing device for a steering column includes an outer ring, an inner ring, at least one row of rolling elements arranged between the rings, and a sleeve mounted in the bore of the inner ring and coming to bear axially against the ring. The sleeve provides a bore designed to come into radial contact with a shaft, and a member for the axial retention of the sleeve that is designed to engage with the shaft. The sleeve has at least one elastic body at least partially delimiting the bore. The axial retention member is mounted to bear axially directly against the sleeve on the opposite side from the inner ring.

18 Claims, 6 Drawing Sheets

ROLLING BEARING DEVICE, IN PARTICULAR FOR A STEERING COLUMN

CROSS-REFERENCE TO RELATED APPLICATIONS

This Application claims priority to French Patent Application FR1356660 filed Jul. 5, 2013, the contents of which are herein fully incorporated by reference.

FIELD OF THE INVENTION

The present invention relates to the field of rolling bearing devices, notably rolling bearings used in motor vehicle steering columns.

BACKGROUND OF THE INVENTION

Steering columns generally comprise a shaft, one end of which is secured to a steering wheel that drives it and is turned by the driver of the vehicle and the other end of which is secured to mechanical members the role of which is to perform the angular positioning of the wheels of the vehicle. The steering column shaft is mounted such that it can rotate in a tubular housing via two rolling bearing devices each comprising a rolling bearing, generally an angular-contact ball bearing, which are mounted in opposition.

The rolling bearing generally comprises an inner ring and an outer ring, each ring being provided with a raceway and a row of rolling elements arranged between the two raceways of the rings. The rolling bearing is mounted in the housing via its outer ring and on the shaft via a sleeve or a ring known as a tolerance ring which makes it possible to compensate for any geometric defects there might be between these two components. The tolerance ring allows the rolling bearing to be mounted easily on the shaft without any initial clamping.

The assembly preferably operates with zero play thanks to an axial preload applied to the sleeve by an axially elastic member. The internal clearances of the rolling bearing are thus taken up and permanent contact between the rings and the rolling elements of the bearing is ensured.

WO 01/69098 (SKF) discloses a rolling bearing comprising an inner ring, an outer ring, a row of rolling elements arranged between the rings, a sleeve which connects the shaft to the inner ring and which is made of a rigid synthetic material, an element for damping vibrations and a crinkle washer arranged axially between a radial surface of the sleeve and the damping element. The crinkle washer makes it possible to apply an axial preload force.

Such a rolling bearing device has the major drawback of comprising a large number of parts which must be manufactured and assembled. Moreover, such a device is not sufficiently compact in the axial dimension.

SUMMARY OF THE INVENTION

The object of the present invention is thus to remedy these drawbacks.

More particularly, the present invention aims to provide a rolling bearing device which is easy to manufacture and mount, which is compact in the axial dimension and which has a limited number of components.

In one embodiment, the rolling bearing device, in particular for a steering column, comprises an outer ring, an inner ring, at least one row of rolling elements arranged between the rings, a sleeve which is mounted in the bore of the inner ring and which comes to bear axially against the ring, the sleeve comprising a bore designed to come into radial contact with an outer shaft. The device also comprises a member for the axial retention of the sleeve comprising retention means designed to engage with the shaft. The sleeve comprises at least one elastic body at least partially delimiting the bore. The axial retention member is mounted so as to bear axially directly against the sleeve on the opposite side from the inner ring.

Advantageously, the sleeve comprises a bearing collar provided with a first bearing surface, against which the inner ring is mounted, and a second opposite bearing surface, against which the axial retention member is mounted. The elastic body of the sleeve may delimit at least the first bearing surface of the bearing collar.

In one embodiment, the sleeve further comprises a rigid thrust washer mounted axially against the elastic body of the sleeve, the axial retention member being mounted so as to bear axially against the washer. Preferably, the thrust washer entirely covers a bearing surface of the elastic body. The thrust washer may form at least part of the bearing collar of the sleeve.

In one embodiment, the sleeve comprises at least one rigid reinforcing insert which is at least partially embedded in the elastic body.

The reinforcing insert may comprise at least one radial or oblique portion extending inside a bearing collar of the sleeve. Alternatively or in combination, the reinforcing insert may comprise axial retention means engaging with complementary retention means of a cage for holding the rolling elements. The reinforcing insert may also comprise an axial portion extending inside a centring portion of the sleeve on which is mounted the inner ring.

In one embodiment, the elastic body of the sleeve is made of an elastic synthetic material such as an elastomer or a rubber or an elastomeric thermoplastic.

In one embodiment, the axial retention member comprises an annular portion which bears axially against the sleeve. The retention means of the axial retention member may extend inwards from the annular portion.

In one embodiment, the axial retention member is attached to the sleeve.

The invention also relates to a steering column comprising a housing, a shaft which is coaxial with the housing and at least one previously-described bearing device which is mounted radially between the housing and the shaft. The rolling bearing device may be mounted in a bore of the housing such that the outer ring is inserted in the bore of the housing and comprises axial attachment means engaging with the housing. Conversely, the housing may comprise axial attachment means engaging with the outer ring.

According to another aspect, the invention also relates to a method for mounting a previously-described rolling bearing device on a shaft, in particular on a steering column shaft, in which a subassembly comprising the outer ring, the inner ring, the one or more rows of rolling elements and the sleeve is mounted on the shaft without radial interference with the shaft, the axial retention member is mounted against the sleeve and an axial force is applied to the sleeve in the direction of the inner ring via the intermediary of the axial retention member such that, by means of elastic deformation, the sleeve is clamped on the shaft radially and the rolling elements are preloaded.

BRIEF DESCRIPTION OF THE DRAWINGS

The present invention will be better understood upon reading the detailed description of embodiments considered as entirely non-limiting examples and illustrated by means of the appended drawings, in which.

DETAILED DESCRIPTION OF THE INVENTION

Figure 1:
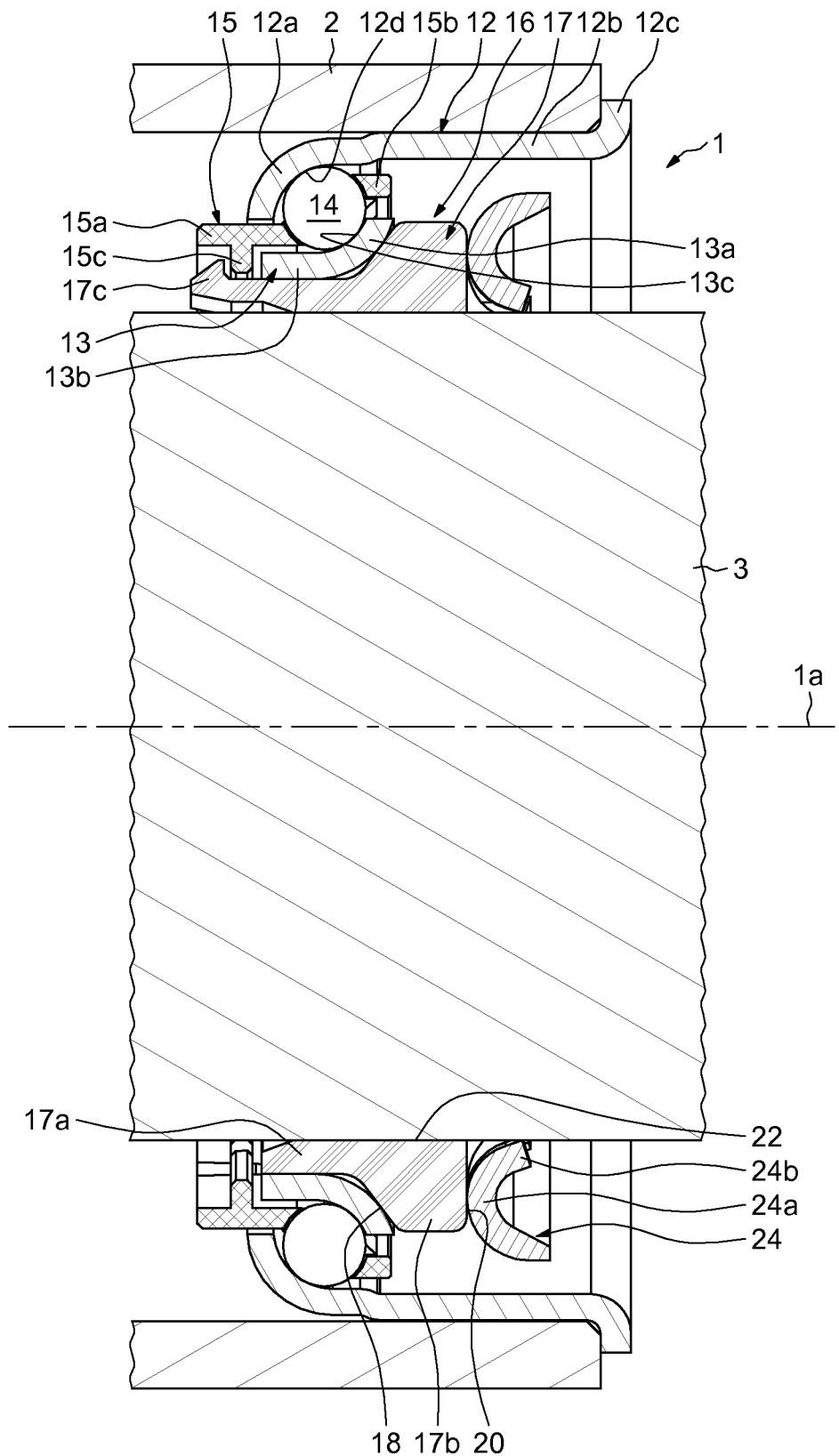
FIG. 1 is a view in axial section of a rolling bearing device according to a first example of the invention.

In FIG. 1, the rolling bearing device, referenced 1 in its entirety, of axis 1a, is designed to be mounted in a motor vehicle steering column between a tubular housing 2 comprising a bore and a rotating shaft 3 which is coaxial with the housing 2 and is mounted in the housing.

The rolling bearing device 1 comprises an outer ring 12, an inner ring 13, a row of rolling elements 14, such as for example balls, arranged between the rings, a cage 15 for maintaining the regular circumferential spacing of the rolling elements 14 and a tolerance ring or sleeve 16 mounted in the bore of the inner ring 13. The inner ring 13 is mounted in direct axial contact with the sleeve 16.

The outer ring 12, made in one piece, comprises a toroidal portion 12a, a cylindrical axial portion 12b and a radial rim 12c. The axial portion 12b is arranged axially between the toroidal portion 12a and the rim 12c, and comes into radial contact against the bore of the tubular housing 2. The toroidal portion 12a is oriented radially inwards from the axial portion 12b. The toroidal portion 12a comprises a concave inner surface having, in cross section, a quarter-circle internal profile forming a raceway 12d for the rolling elements 14. The rim 12c is oriented radially outwards from one edge of the axial portion 12b located on the opposite side from the toroidal portion 12a. The rim 12c comes to bear axially against the housing 2. The rim 12c forms an axial retention means for the outer ring 12 on the housing 2.

The inner ring 13, made in one piece, comprises a toroidal portion 13a and a cylindrical axial portion 13b which axially extends a small-diameter edge of the toroidal portion. The toroidal portion 13a comprises a concave outer surface having, in cross section, a quarter-circle internal profile forming a raceway 13c for the rolling elements 14. The raceway 12d is arranged on one side and the raceway 13c on the other side of a radial plane passing through the centre of the rolling elements 14.

The outer ring 12 and inner ring 13 may be manufactured from a portion of tube or from a piece of sheet metal, for example by cutting and drawing. The thickness of the outer ring 12 and inner ring 13 may be substantially constant. The inner ring 13 is mounted with sliding contact on the sleeve 16 and is not retained axially by the sleeve.

The holding cage 15 may be made of a synthetic material, for example a polyamide which may be reinforced by means of a mineral filler. The cage 15 comprises a small-diameter annular axial portion 15a passing between the free end of the toroidal portion 12a of the outer ring and the outer surface of the axial portion 13b of the inner ring, and a large-diameter annular axial portion 15b arranged between the free end of the toroidal portion 13a of the inner ring and the bore of the axial portion 12b of the outer ring. The cage 15 also comprises an oblique central portion (not visible) which connects to the axial portions 15a, 15b and in which are created pockets for the rolling elements 14. The small-diameter axial portion 15a is provided, on its bore, with a radial protuberance 15c which extends radially inwards and which is designed to engage by diametric interface with the sleeve 16 with a view to the relative axial retention of the sleeve and of the cage 15.

The sleeve 16 comprises a body 17 made of an elastic material, for example an elastic synthetic material such as an elastomer or a rubber or an elastomeric thermoplastic. In the exemplary embodiment shown, the sleeve 16 is made in one piece or as a single part, specifically the body 17.

The body 17 of the sleeve comprises an annular axial centring portion 17a which is mounted in the bore of the inner ring 13 and which comes to bear radially against the bore, and an annular radial bearing collar 17b extending outwards from one end of the centring portion 17a which is located on the side of the toroidal portion 13a of the inner ring. The bearing collar 17b is delimited axially by a frustoconical bearing surface 18, against which the toroidal portion 13a of the inner ring comes to bear axially, and by an opposite radial annular bearing surface 20 which is oriented axially on the opposite side from the inner ring, i.e. outwards. The centring portion 17a and the bearing collar 17b delimit a bore 22 of the sleeve which bears radially against the outer surface of the shaft 3, as will be described in more detail below. The bore 22 of the sleeve is continuous in the circumferential direction.

The body 17 of the sleeve also comprises a plurality of hooks 17c which extend axially and radially outwards from one free end of the centring portion 17a located axially opposite the bearing collar 17b. The hooks 17c are regularly distributed in the circumferential direction and are dimensioned so as to engage with the radial protuberance 15c of the cage by diametric interference. The sleeve 16 extends axially on either side of the inner ring 13.

The device 1 also comprises a member 24 for the axial retention of the sleeve on the shaft 3, which is separate from the sleeve. The axial retention member 24 is mounted such that it bears axially directly against the sleeve 16 on the side opposite the inner ring 13. The retention member 24 is in direct contact with the bearing surface 20 of the collar of the sleeve. In the exemplary embodiment shown, the axial retention member 24 is made in the shape of a spring washer. The axial retention member 24 comprises an annular concave bearing portion 24a which bears axially, over its entire periphery, against the bearing surface 20 of the body of the sleeve, and a plurality of elastic tabs 24b which extend a small-diameter edge of the bearing portion obliquely inwards towards the shaft 3. The tabs 24b are provided in order to flex elastically when the axial retention member 24 engages on the shaft 3 and in order to avoid, by bracing against the shaft, any axial displacement of the retention member on the shaft 3 in the direction counter to its engagement or mounting direction. The tabs 24b form means for the axial retention of the retention member and of the sleeve 16 on the shaft 3.

The device 1 is mounted between the shaft 3 and the housing 2, as follows. In a first step, the subassembly consisting of the outer ring 12, the inner ring 13, the rolling elements 14, the cage 15 and the sleeve 16 is introduced into the radial space delimited between the housing 2 and the shaft 3 until the rim 12c of the outer ring comes to bear against the housing. In the free state, the diameter of the bore 22 of the sleeve is greater than the diameter of the outer surface of the shaft 3. The subassembly is thus mounted with no radial interference between the sleeve 16 and the shaft 3.

Then, in a second step, the axial retention member 24 is mounted bearing against the bearing collar 17b of the sleeve and an axial force is exerted on the sleeve in the direction of the inner ring 13 via the axial retention member. Once the axial force has been exerted on the sleeve 16, the tabs 24 of the retention member hold the sleeve axially in the compressed state relative to the shaft 3.

The external axial force exerted on the sleeve 16 via the axial retention member 24 makes it possible to elastically compress the body 17 of the sleeve axially between the inner ring 13 and the retention member and thus to prestress the device 1. The axial retention member 24 thus has a dual role, specifically to exert and maintain an axial prestress force on the rolling bearing via the sleeve 16, and to hold the sleeve axially on the shaft 3.

Moreover, the axial prestress force exerted by the axial retention member 24 causes an elastic deformation of the body 17 of the sleeve radially inwards towards the shaft 3, whereby it is possible to obtain a radial contact between the bore 22 of the sleeve and the outer surface of the shaft. The sleeve 16 is clamped on the shaft 3 by means of inward radial deformation of the body 17.

It is possible, by using a sleeve 16 comprising a deformable elastic body 17, to avoid the use of an additional elastic prestress element mounted axially between the sleeve and the inner ring, or even the use of a metal crinkle washer interposed axially between the sleeve and the axial retention member. The number of parts to manufacture and to mount is thus further reduced. The overall axial bulkiness of the device 1 is also reduced. Moreover, the axial prestress of the device 1 and the radial clamping on the shaft 3 is obtained in a single operation.

Furthermore, the axial retention member 24 comprises an annular bearing portion 24a which is in axial contact against the annular bearing collar 17b of the sleeve. The axial force exerted by the axial retention member 24 on the sleeve 16 and on the inner ring 13 is uniform in the circumferential direction.

Figure 2:
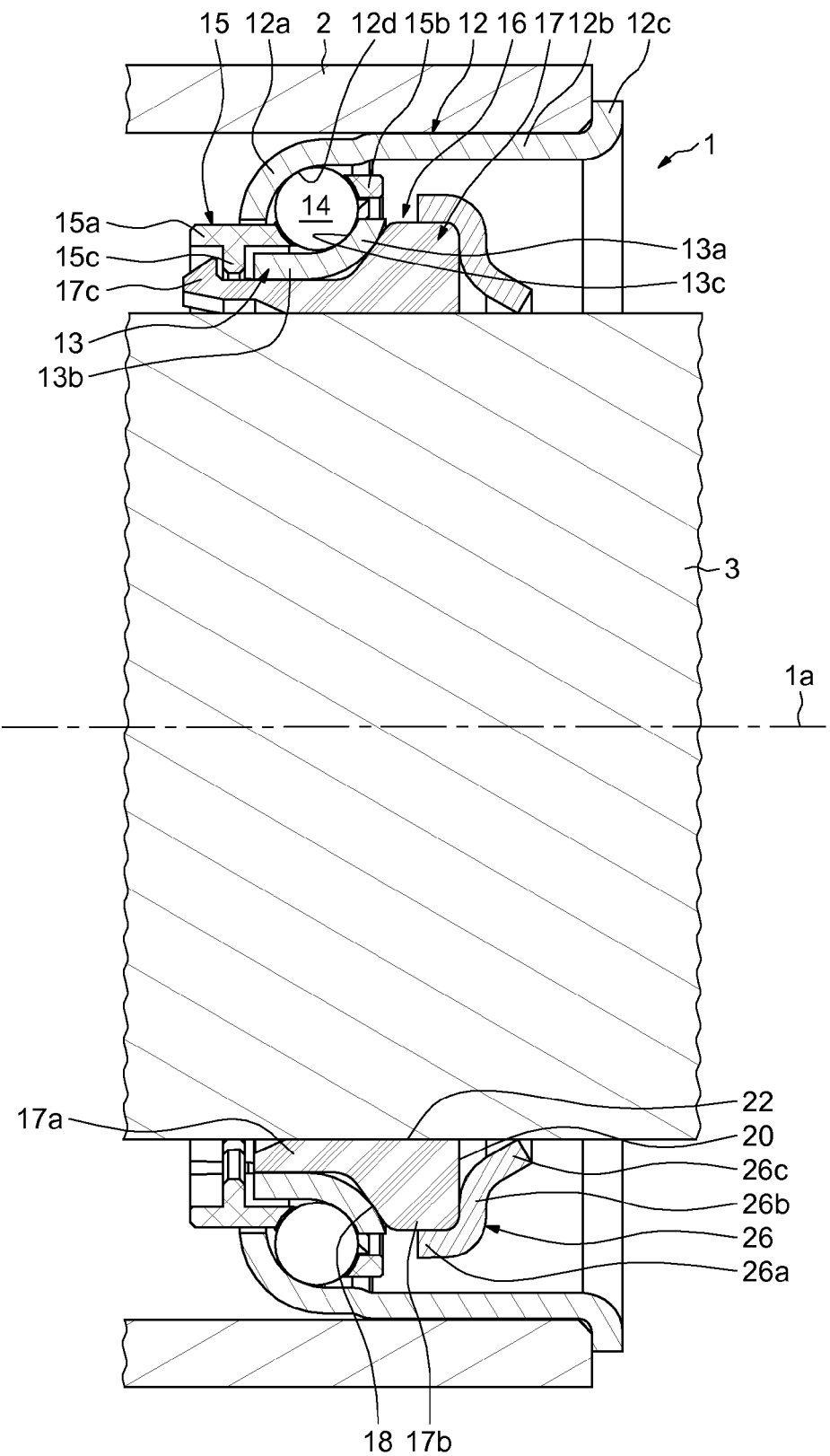
FIGS. 2 to 6 are views in axial section of rolling bearing devices according to second, third, fourth, fifth and sixth examples of the invention.

The exemplary embodiment shown in FIG. 2, in which identical elements bear the same references, differs only in that the device 1 comprises an axial retention member 26 comprising an annular outer axial portion 26a fastened to the outer surface of the bearing collar 17b of the body of the sleeve, and an annular radial portion 26b extending inwards from the axial portion 26a and mounted axially such that it bears directly over its entire periphery against the bearing surface 20 of the bearing collar. The axial retention member 26 is fastened axially on the body 17 of the sleeve via the outer axial portion 26a.

The axial retention member 26 also comprises an oblique portion 26c obliquely extending the radial portion 26b inwards towards the shaft 3, axially on the opposite side from the axial portion 26a. The oblique portion 26c is provided in order to flex elastically when the axial retention member 26 engages on the shaft 3 and in order to avoid, by bracing against the shaft, any axial displacement in the direction counter to its engagement direction. The oblique portion 26c forms means for the axial retention of the retention member and of the sleeve 16 on the shaft 3. In this exemplary embodiment, the axial retention member 26 is formed by a spring washer of different design to that of the first embodiment.

Figure 3:
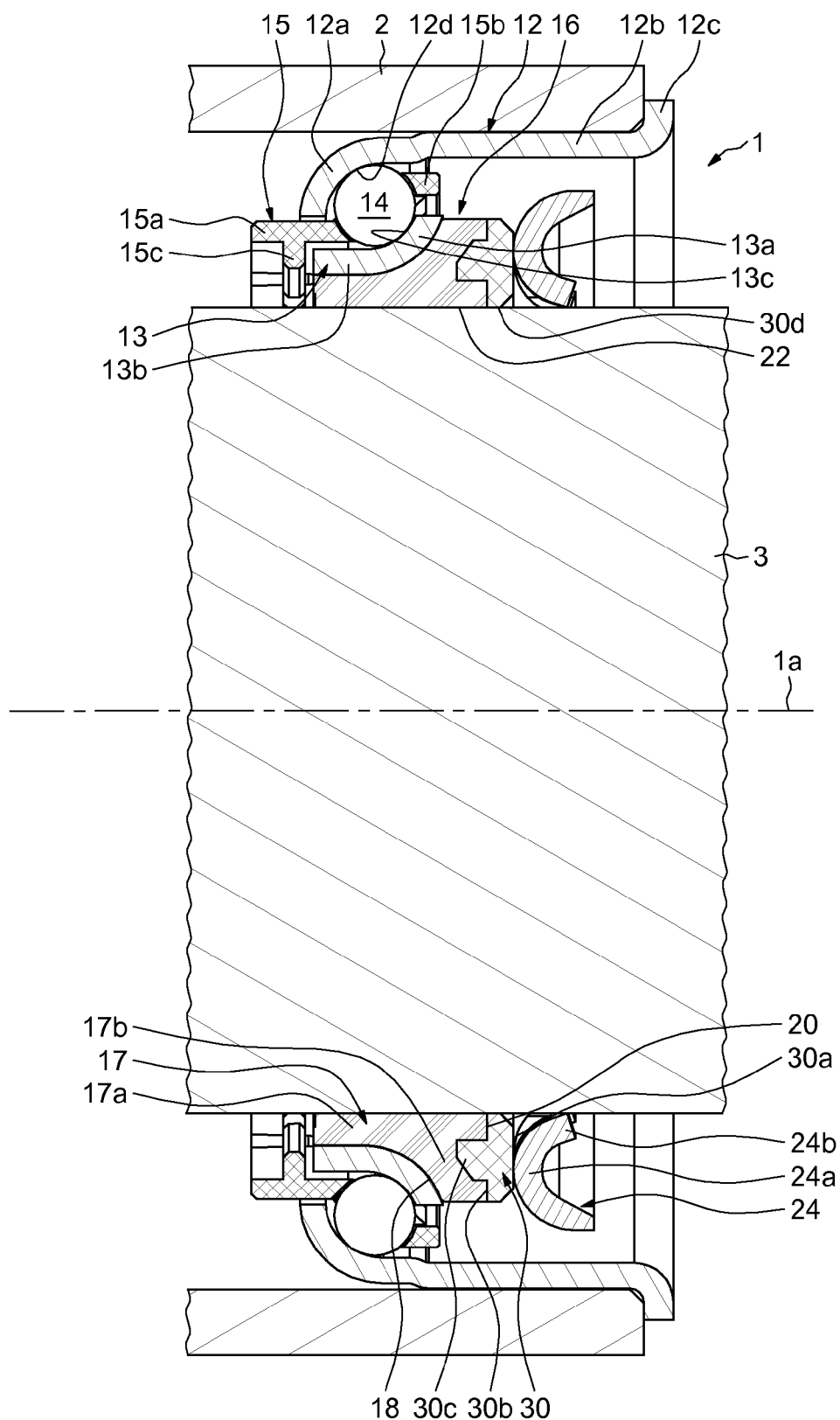

The exemplary embodiment shown in FIG. 3, in which identical elements bear the same references, differs from the first embodiment only in that the sleeve 16 further comprises a thrust washer 30 fastened axially on the elastic body 17. The thrust washer 30 is of annular shape and is delimited axially by two opposing radial surfaces 30a, 30b. The radial surface 30a forms a bearing surface against which is mounted axially the axial retention member 24, in direct contact, and the radial surface 30b forms an abutment surface bearing in the axial direction against the bearing surface 20 of the collar 17b of the sleeve. The thrust washer 30 is thus on one hand in axial contact against the elastic body 17 of the sleeve and on the other hand in axial contact with the axial retention member 24. The bore 30d of the thrust washer 30 extends the bore 22 of the body 17 axially. The bores 22 and 30d have the same diameter. The bore of the sleeve 16 is formed by the bore 22 of the body and the bore 30d of the thrust washer. The bore of the sleeve 16 is continuous in the circumferential direction.

The thrust washer 30 also comprises an annular protuberance 30c which extends axially from the radial surface 30b in the direction of the inner ring 13 and is housed in an annular notch (not referenced) of corresponding shape created from the bearing surface 20 of the collar 17b of the elastic body of the sleeve. The thrust washer 30 is fastened axially to the body 17, by any suitable means, for example by adhesive bonding. As a variant, the body 17 may be overmoulded onto the thrust washer 30. The thrust washer 30 is made of a rigid material, for example of a synthetic material such as a polyamide or of a metallic material for example from a sheet metal blank, by cutting and drawing.

The radial dimension of the thrust washer 30 is equal to that of the bearing surface 20 of the elastic body 17 of the sleeve. The thrust washer 30 entirely covers the bearing surface 20. The risk of a possible stress concentration effect at the bearing surface 20 of the body 17 of the sleeve is thus limited when the axial prestress force is exerted by the axial retention member 24. Moreover, the axial creep of the elastic body 17 of the sleeve, axially in the direction of the axial retention member 24, is prevented.

Figure 4:
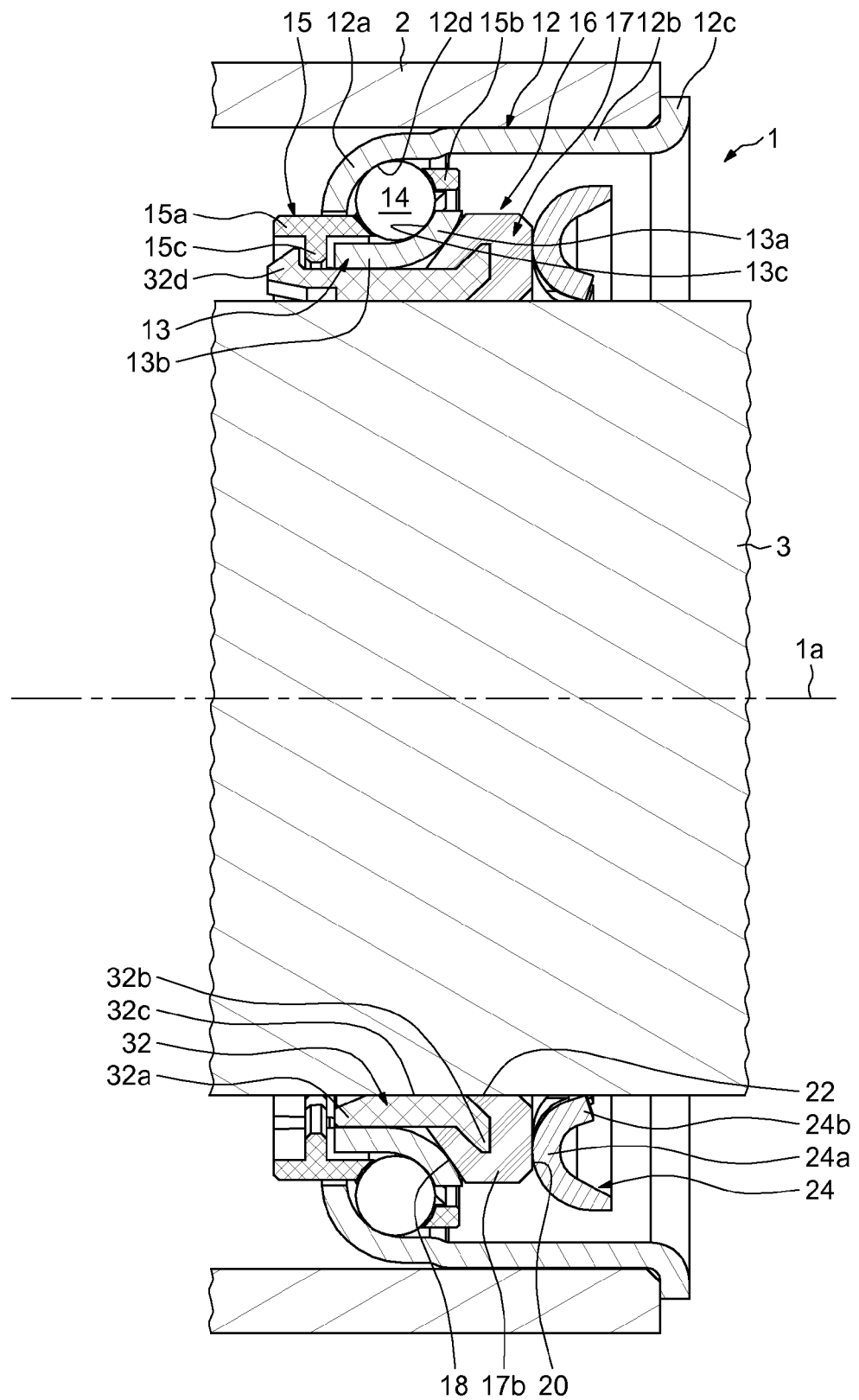
Figure 5:
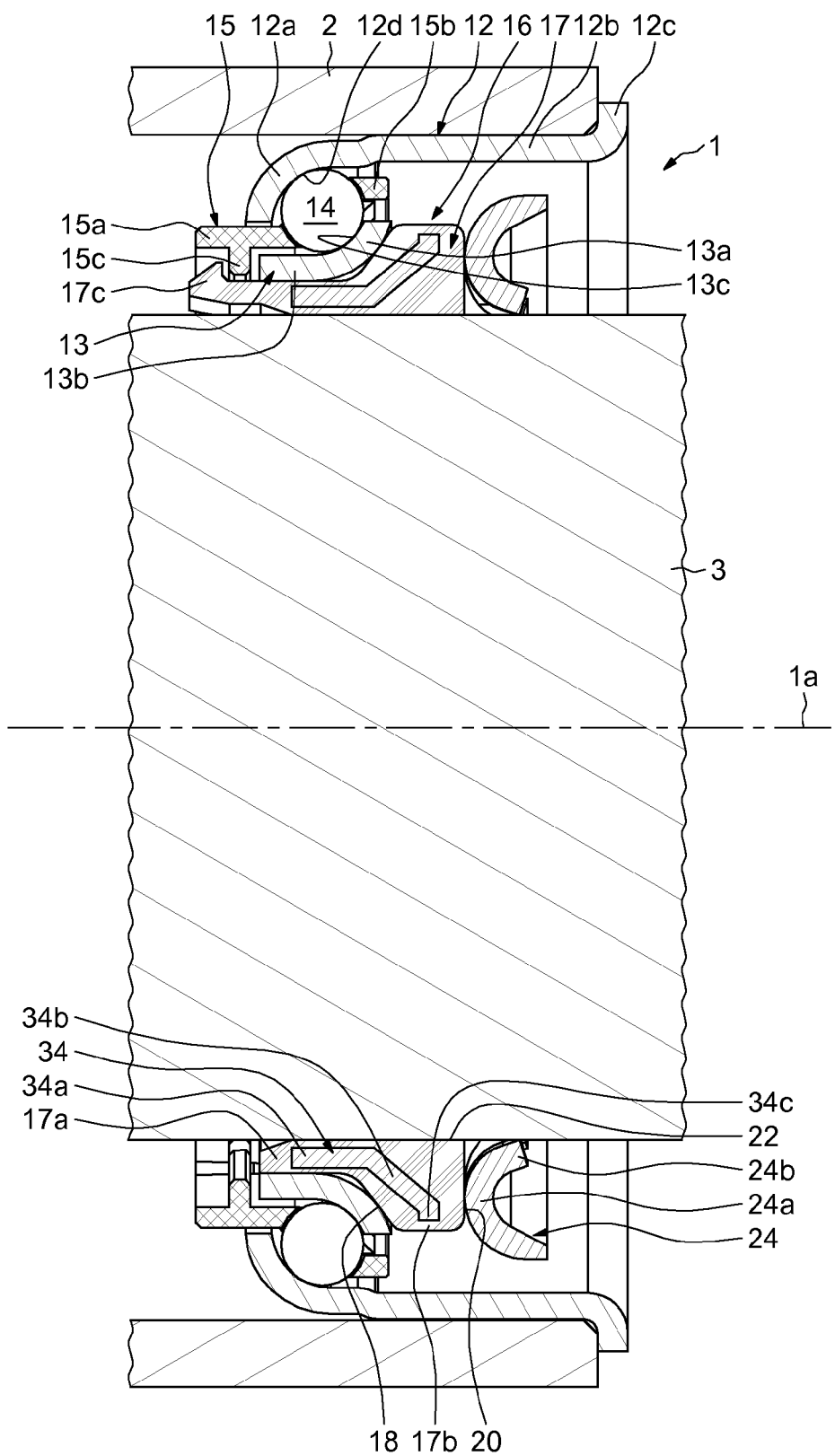
Figure 6:
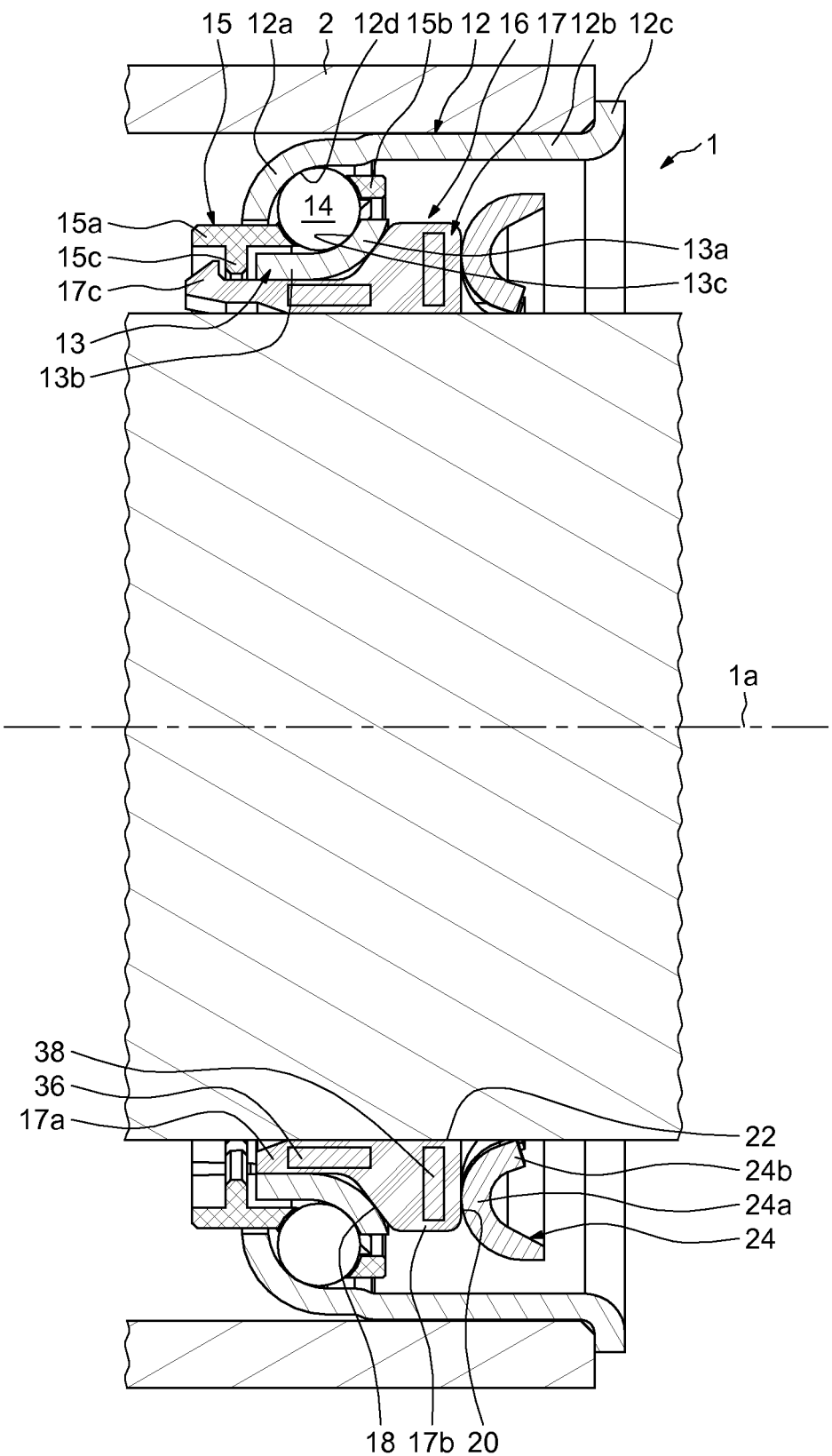

The exemplary embodiments shown in FIGS. 4 to 6, in which identical elements bear the same references, illustrate the use of a reinforcing insert at least partially embedded in the body 17 in order to increase the mechanical strength of the sleeve 16.

The exemplary embodiment shown in FIG. 4 differs from the first exemplary embodiment in that the sleeve 16 comprises a rigid reinforcing insert 32 made in one piece, for example in a metal material or a synthetic material. The reinforcing insert 32 comprises an annular axial centring portion 32a arranged in the bore of the inner ring 13 and mounted so as to bear radially against the bore, and an annular oblique portion 32b extending outwards from one end of the centring portion located axially on the side of the toroidal portion 13a of the inner ring. The oblique portion 32b extends inside the bearing collar 17b of the body of the sleeve. The oblique portion 32b is located axially between the bearing surfaces 18, 20 of the collar. The centring portion 32a extends in part inside the bearing collar 17b and outside the body 17 of the sleeve so as to permit the support of the axial portion 13b of the inner ring. The centring portion 32a delimits a bore 32c which axially extends the bore 22 formed by the bearing collar of the body 17. The bores 32c, 22 have the same diameter and are continuous in the circumferential direction.

The reinforcing insert 32 also comprises a plurality of hooks 32d extending axially and radially outwards from one free end of the centring portion 32a located axially opposite the oblique portion 32b. The hooks 32d are in this case regularly distributed in the circumferential direction and are dimensioned so as to engage with the radial protuberance 15c of the cage by diametric interference so as to obtain the axial retention of the sleeve 16 on the cage.

The exemplary embodiment shown in FIG. 5 differs from the first exemplary embodiment only in that the sleeve comprises a rigid reinforcing insert 34 which is entirely embedded in the elastic body 17 of the sleeve. The reinforcing insert 34, of annular general shape, comprises a cylindrical axial portion 34a which extends inside the centring portion 17a of the body of the sleeve and which is extended outwards by an oblique portion 34b extending inside the bearing collar 17b of the body. The reinforcing insert 34 also comprises a short radial portion 34c extending radially outwards a large-diameter edge of the oblique portion 34b. The reinforcing insert 34 is made in a single piece for example of a metallic material or by moulding from a rigid synthetic material.

The exemplary embodiment shown in FIG. 6 differs from the first exemplary embodiment only in that the sleeve 16 comprises two rigid reinforcing inserts 36, 38 which are entirely embedded in the elastic body 17 of the sleeve. The insert 36 extends axially inside the centring portion 17a of the body of the sleeve and the reinforcing insert 38 extends radially inside the bearing collar 17b of the body in the vicinity of the bearing surface 20. The annular reinforcing inserts 36, 38 may be made of a metallic material or of a synthetic material.

In the exemplary embodiments described previously, each axial retention member is in the form of a spring washer. It is however possible to provide an axial retention member of different design, for example an annular ring, while nonetheless keeping means for retention on the shaft and the direct axial contact between the member and the sleeve in order that, on one hand, the device is held axially on the shaft and, on the other hand, an axial prestress force is exerted directly on the elastic body of the sleeve, allowing operation with zero axial play and radial clamping of the sleeve on the shaft by means of radially inward elastic deformation of the body.

The axial retention member makes it possible to exert an axial force on the sleeve, the elastic body of which makes it possible to transmit a circumferentially uniform prestress to the inner ring and, consequently, to the rolling elements and the outer ring. The elastic body deforms under the axial force exerted by the axial retention member, in particular radially at the bore in contact against the outer shaft. The functions of prestressing the device and of clamping the sleeve on the shaft are achieved simultaneously without having to integrate additional elements into the device. The sleeve being clamped on the shaft in this manner makes it possible to prevent any relative rotation between the shaft and the sleeve, thus optimizing the coupling between the rolling bearing device and the shaft.

The invention claimed is:

1. A rolling bearing device for a steering column, comprising:
    an outer ring,
    an inner ring,
    at least one row of rolling elements arranged between the rings,
    a cage that holds the at least one row of the rolling elements,
    a sleeve mounted in the bore of the inner ring coming to bear axially against the inner ring, wherein the sleeve has a bore designed to come into radial contact with a shaft, wherein first and second portions of the sleeve extend axially beyond opposing axial ends of the inner ring, and wherein the first portion of the sleeve comprises a hook that extends radially-outward therefrom and engages the cage, and
    a member for the axial retention of the sleeve providing retention means designed to engage with the shaft, and wherein
    the sleeve includes at least one elastic body at least partially delimiting the bore, the axial retention member being mounted to bear axially directly against the sleeve on the opposite side from the inner ring.

2. The device according to claim 1, wherein the axial retention member is attached to the sleeve.

3. The device according to claim 1, wherein the first and second portions each extend radially-outward past a radially-innermost surface of the inner ring.

4. The device according to claim 1, wherein the first portion is farther away from the axial retention member than the second portion, and wherein the first portion comprises the hook.

5. The device according to claim 1, wherein the sleeve includes a bearing collar having a first bearing surface, against which the inner ring is mounted, and a second opposite bearing surface, against which the axial retention member is mounted.

6. The device according to claim 5, wherein the elastic body of the sleeve delimits at least the first bearing surface of the bearing collar.

7. The device according to claim 1, wherein the sleeve provides a rigid thrust washer mounted axially against the elastic body of the sleeve, the axial retention member being mounted to bear axially against the washer.

8. The device according to claim 7, wherein the thrust washer entirely covers a bearing surface of the elastic body.

9. The device according to claim 1, wherein the sleeve includes at least one rigid reinforcing insert at least partially embedded in the elastic body.

10. The device according to claim 9, wherein the reinforcing insert provides at least one of a radial and oblique portion extending inside a bearing collar of the sleeve.

11. The device according to claim 9, wherein the reinforcing insert includes axial retention means engaging with complementary retention means of the cage.

12. The device according to claim 9, wherein the reinforcing insert comprises an annular axial centering portion arranged in the bore of the inner ring and mounted so as to bear radially against the bore.

13. The device according to claim 1, wherein the elastic body of the sleeve is made of an elastic synthetic material.

14. The device according to claim 13, wherein the elastic body of the sleeve is made of one of an elastomer, a rubber, and an elastomeric thermoplastic.

15. The device according to claim 1, wherein the axial retention member includes an annular portion axially bearing against the sleeve.

16. The device according to claim 15, wherein the retention means of the axial retention member extend inwards from the annular portion.

17. A steering column comprising:
    a housing,
    a shaft coaxial with the housing and at least one bearing device mounted radially between the housing and the shaft, the at least one bearing device having;
    an outer ring,
    an inner ring,
    at least one row of rolling elements arranged between the rings,
    a sleeve mounted in the bore of the inner ring coming to bear axially against the inner ring, wherein the sleeve has a bore designed to come into radial contact with a shaft, wherein first and second portions of the sleeve extend axially beyond opposing axial ends of the inner ring, and wherein the first portion of the sleeve comprises a hook that extends radially-outward therefrom and engages the cage, and
    a member for the axial retention of the sleeve providing retention means designed to engage with the shaft, and wherein
    the sleeve includes at least one elastic body at least partially delimiting the bore, the axial retention member being mounted to bear axially directly against the sleeve on the opposite side from the inner ring.

18. A method for mounting a rolling bearing device on a steering column shaft, comprising the steps of:

providing an outer ring, an inner ring, at least one row of rolling elements arranged between the rings, a cage that holds the at least one row of rolling elements, a sleeve mounted in the bore of the inner ring coming to bear axially against the inner ring, wherein the sleeve has a bore designed to come into radial contact with a shaft, wherein first and second portions of the sleeve extend axially beyond opposing axial ends of the inner ring, and wherein the first portion of the sleeve comprises a hook that extends radially-outward therefrom and engages the cage, and a member for the axial retention of the sleeve providing retention means designed to engage with the shaft, and wherein the sleeve includes at least one elastic body at least partially delimiting the bore, the axial retention member being mounted to bear axially directly against the sleeve on the opposite side from the inner ring, and a subassembly providing the outer ring, the inner ring, the one or more rows of rolling elements and the sleeve is mounted on the shaft without radial interference with the shaft, the axial retention member is mounted against the sleeve and an axial force is applied to the sleeve in the direction of the inner ring via the intermediary of the axial retention member such that, by means of elastic deformation, the sleeve is clamped on the shaft radially and the rolling elements are preloaded.

* * * * *